Jan. 26, 1965 D. M. J. COMPTON 3,167,461
PROCESS OF PREPARING DEGENERATELY DOPED SEMICONDUCTOR SOURCE MATERIAL
Filed Dec. 30, 1960
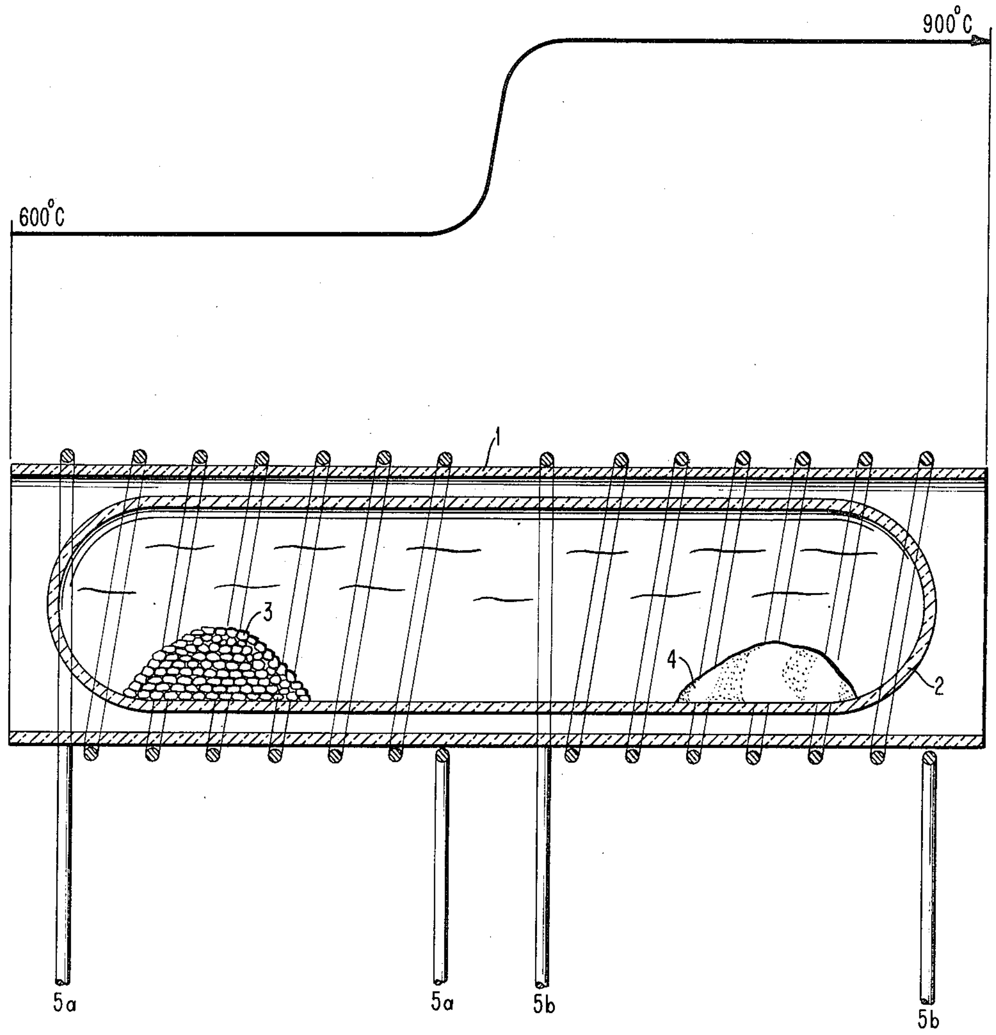
INVENTOR
DINSDALE M. J. COMPTON
BY John F. Ohlandt Jr.
ATTORNEY

United States Patent Office 3,167,461
Patented Jan. 26, 1965

3,167,461
PROCESS OF PREPARING DEGENERATELY DOPED SEMICONDUCTOR SOURCE MATERIAL

Dinsdale M. J. Compton, Solana Beach, Calif., assignor to International Business Machines Corporation, New York, N.Y., a corporation of New York Filed Dec. 30, 1960, Ser. No. 79,897
2 Claims. (Cl. 148—175)

This invention relates in general to the art and process of vapor growth of semiconductor bodies and in particular to a technique for producing heavy doping of the source material to be used in the vapor growth process.

The basic vapor growth or vapor deposition process that has been previously developed in essence involves a reaction wherein a transport element, such as a halogen, combines in one zone of a reaction container with a source of semiconductor material. The products of the reaction move to another temperature zone where they decompose with the result that the freed semiconductor material forms an epitaxial crystal growth region on a substrate provided in the latter zone. The vapor growth process affords the advantage of controllable doping of the deposited material and permits of broad area fabrication, thus rendering the technique extremely important in forming device arrays such as are used in computers.

The vapor growth process has recently been successfully extended to the fabrication of Esaki diodes. The nature and characteristics of these novel diodes were first discussed in an article entitled, "New Phenomenon in Narrow Germanium P-N Junctions," by Leo Esaki, Physical Review, volume 109, January 15, 1958. In the fabrication of Esaki or tunnel diodes it is necessary that the individual regions be degenerately doped, that is, that the doping concentration be on the order of $1 \times 10^{19}$ atoms per cubic centimeter.

It has been found in the practice of the vapor growth process, referred to above, that it is generally better to incorporate the dopant homogeneously in the source material before the growth process is initiated rather than to employ a separate source of dopant in the process. This is for the reason that when the dopant is incorporated homogeneously, a predictable quantity of the dopant will be transported along with the semiconductor source material and thus the final doping concentration in the growth region can be quite simply controlled. However, when it comes to the fabrication of Esaki diodes by the vapor growth process, in order to get the high degree of doping required in the growth region, the source material must be very highly doped. As a result, many difficulties are encountered. In particular, it has been found that when the attempt is made to dope the material, which is to be used as the source, to a very high concentration, the semiconductor material becomes polycrystalline, and consequently a different concentration of dopant will exist in the grain-boundary matrix, thereby resulting in loss of control of doping.

The technique of the present invention overcomes the difficulties attendant the doping requirements in preparing source material for vapor growth of Esaki diodes. The technique involves, in essence, the employment of a fine powder of semiconductor material for use as the source and the introduction of the desired impurity into the semiconductor material by diffusion. It is, of course, known that diffusion from the vapor is able to produce heavy enough doping to make Esaki diodes. However, diffusion into a normal piece of semiconductor material would not be a suitable method of preparing source material for the vapor growth process since in any reasonable time the doping would not be homogeneous and thus, there would be lack of control of doping in the deposited semiconductor material. The use of a sufficiently fine powder reduces this problem of lack of control of doping since homogeneous doping of the source material will be reached after a diffusion time readily attained in practice. The source material will be single crystal and the formation of a liquidus layer can readily be controlled and avoided by methods well known in the art.

Accordingly, it is a principal object of the present invention to provide a degenerately doped semiconductor source material for use in the vapor growth process of making Esaki diodes.

Another object is to insure that the source material will be homogeneously doped so that in the vapor growth process ready control of the doping will be attainable.

The foregoing and other objects, features and advantages of the invention will be apparent from the following more particular description of a preferred embodiment of the invention, as illustrated in the accompanying drawings.

The figure is a schematic illustration of apparatus used in achieving degenerate doping of semiconductor material in accordance with the present invention.

Referring now to the figure, there is shown a reaction container 1 around which are wound resistance windings *5a* and *5b*, connected to a source of power, not shown. The windings serve to provide a source of heat. Inside the reaction container is an evacuated quartz tube 2 and disposed within the quartz tube is a quantity of dopant labeled 3 and a quantity of semiconductor material labeled 4, which material is shown as a finely divided powder obtained, for example, by grinding down a semiconductor wafter. A correlated temperature profile above the figure indicates the temperatures that have been selected for each end of the tube. With the profile as illustrated, the dopant 3 diffuses into the semiconductor material 4 to an extent sufficient to make the semiconductor material degenerate.

In an experimential run, the dopant used was arsenic and the semiconductor material germanium; however, it will be understood that other impurity agents and other semiconductor materials may be employed in the practice of the present invention.

While the invention has been particularly shown and described with reference to a preferred embodiment thereof, it will be understood by those skilled in the art that various changes in form and details may be made therein without departing from the spirit and scope of the invention.

I claim:

1. A method of forming Esaki diodes by vapor growth, which comprises the reaction of a transport element with a source of semiconductor material and the decomposition of the products of the reaction to form an epitaxial crystalline growth on a substrate, wherein such method it is required that the source material be homogeneously and degenerately doped on the order of at least $1 \times 10^{19}$ a./cc., further comprising the preparation of said source material by the steps of dividing a quantity of said semiconductor material into a fine powder and diffusing an impurity agent into said fine powder whereby homogeneous, degenerate, doping of the source material is obtained.

2. A method as defined in claim 1 wherein said semiconductor material is Ge and said impurity material is As.

References Cited in the file of this patent

UNITED STATES PATENTS 2,921,905 Hung-Chi Chang -------- Jan. 19, 1960

OTHER REFERENCES

Glasstone et al.: The Theory of Rate Processes, first ed., 1941, McGraw-Hill Book Co., New York, pp. 542–543.